No. 727,302. PATENTED MAY 5, 1903.
H. A. DANNE.
WEIGHING MACHINE.
APPLICATION FILED DEC. 27, 1901.
NO MODEL. 2 SHEETS—SHEET 2.
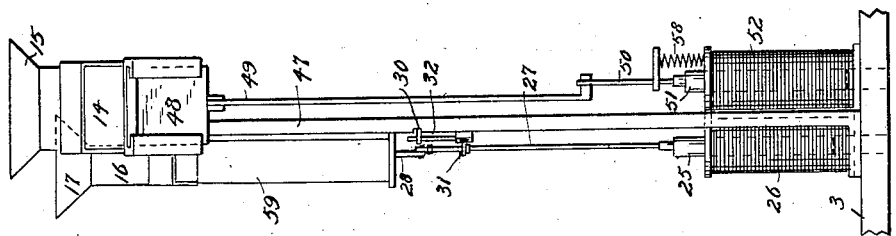
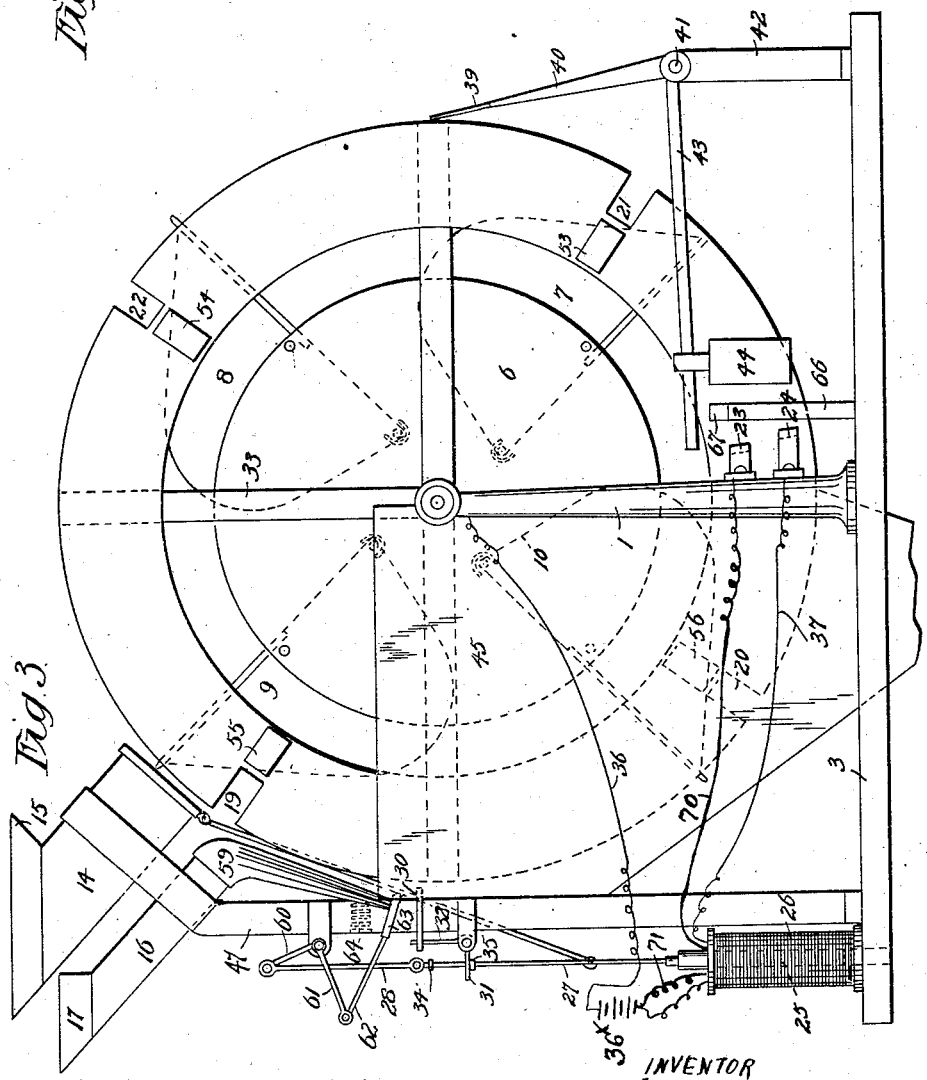
WITNESSES:
Isabella Waldrow.
Adelaide Claire Gleason.
INVENTOR
Harold Alexander Danne.
BY
Richardson
ATTORNEYS.

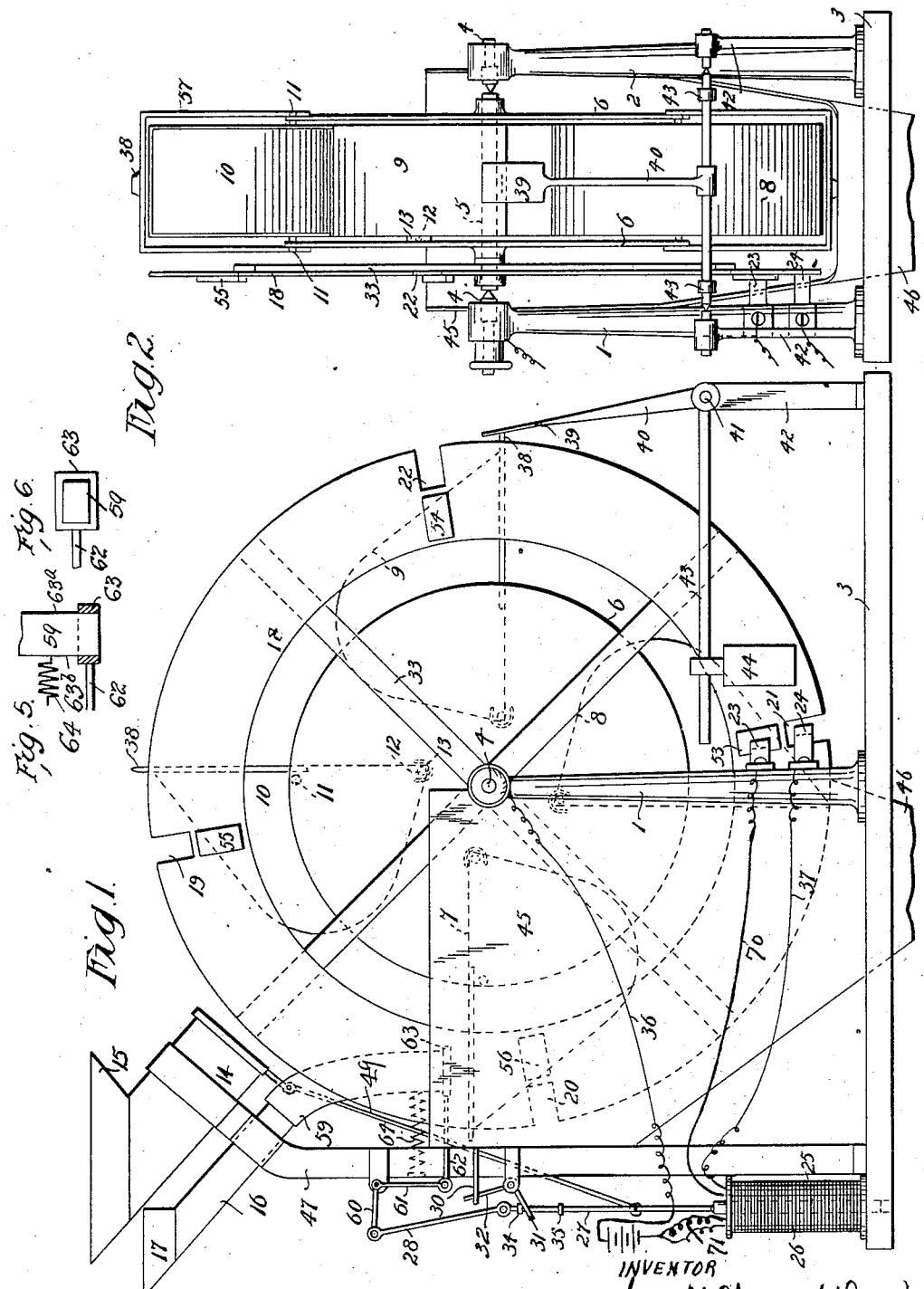

No. 727,302.

Patented May 5, 1903.

UNITED STATES PATENT OFFICE.

HAROLD ALEXANDER DANNE, OF RICHMOND, VICTORIA, AUSTRALIA.

WEIGHING-MACHINE.

SPECIFICATION forming part of Letters Patent No. 727,302, dated May 5, 1903.

Application filed December 27, 1901. Serial No. 87,477. (No model.)

*To all whom it may concern:*

Be it known that I, HAROLD ALEXANDER DANNE, a subject of the King of Great Britain and Ireland, residing at Poonarree, Victoria street, Richmond, in the State of Victoria, Australia, have invented certain new and useful Improvements in Weighing-Machines, of which the following is a specification.

The object of this invention is to provide a machine by means of which quantities of goods—such as sugar, tea, grain, &c.—can be measured out in predetermined weights or quantities.

The machine is adapted for weighing out quantities of (for example) tea, which will be supplied into the machine through a feed hopper or hoppers and which will then be automatically weighed out and the quantity predetermined upon will pass out by a chute and may be arranged to run directly into bags or other packages.

The machines may be constructed of any dimensions to serve the different purposes for which they may be employed.

Referring now to the accompanying sheet of drawings, Figure 1 shows a front elevation of the machine; Fig. 2, a side elevation. Fig. 3 is a view corresponding with Fig. 1, but with the movable parts in an altered position. Fig. 4 is a view looking onto face of feed-hoppers and mechanism for operating the check or control of feed. Figs. 5 and 6 are detail views relating to the chute extension.

In the drawings, the reference-figures 1 and 2 represent standards set upon a base-plate or bed 3. These standards form supports for center 4, between the pointed ends of which the axle 5 is pivoted, so as to rotate with a minimum of friction. The axle 5 carries frames or disks 6, between and to both of which are pivoted pans or buckets 7 8 9 10 on pivot-pins 11. The pans are prevented from swinging on their pivots beyond a certain compass by studs 12, set on the pans, which lie within U-shaped guides 13, set on the inside faces of the frames or disks 6.

14 and 16 represent large and small chutes with feed-hoppers 15 17. These are set over the pan to be fed and are supported by frame or standard 47, and the large chute 14 is provided with a shutter 48 to control the supply of material to the pans or buckets, and the small chute 16 has a flexible extension 59.

Upon the axle 5 is mounted also a frame 33, supporting metallic strip 18. The metallic strip 18 has slots 19 20 21 22 formed in it, and it also has planted on it contact-strips 53 54 55 56. Brushes or contacts 23 24 are secured to standard 1 and are arranged to impinge upon the contact-strips 53 54 55 56 and disk 18, respectively, to make and break an electrical circuit to operate through intermediate mechanism the outlet of the chutes. The contact 24 is in circuit with solenoid 26, the core 25 of which latter is connected to rod 27, and which rod is connected by link 28 to an arm 60 of a bell-crank lever, the other arm 61 of which is connected by rod 62 to collar 63 at end of flexible extension 59.

64 is a spiral spring connected with the upright 47 and extension 59. The extension-chute 59 is attached at one side $63^a$ to the band, and the other side $63^b$ is connected with the said spiral spring 64, so that when the chute is moved into the position shown in Fig. 3 it will close and when returned to the position shown in Fig. 1 it will open.

The rod 27 enters a slot formed in one arm 31 of a pivoted bell-crank lever, the other arm 32 of which enters a slot formed in pin 30. The rod 27 has two stops 34 35 upon it and set at the necessary distance apart to operate to draw out or force in the pin 30 at a required time, as hereinafter described. The electrical circuit to control the outlet of small chute 16 from the battery is from battery $36^\times$ by wire 36, through center 4, axle 5, metallic strip 18, brush 24, wire 37, through solenoid 26 to battery $36^\times$. The shutter 48 of main hopper is controlled from core 51, Fig. 4, of solenoid 52 by the extension-rod 50, connected to shutter by link 49.

To the frames or disks 6 are attached arms 57, that carry projections 38 upon their forward end and these are arranged to bear upon a pressure-plate 39, the pressure of which is to be adjusted to suit the required weight of material to be delivered from the pan. The plate 39 is connected by arm 40 to shaft 41. This shaft has bearings or centers in uprights 42, and upon said shaft are mounted levers 43, one at each side, that carry an adjustable weight 44, by adjusting the position of which the inward pressure of the plate 39 is controlled.

45 represents casing in which the buckets rest while they are being filled, and this casing tapers to an outlet 46, the chute from which the weighed-out material is delivered.

66 represents a stop to limit the fall of levers 43, and 67 a cushion on same.

The circuit through the solenoid 52 and contact 23 includes also the battery 36× and the wire 36, the connection from the contact 23 to the solenoid being through the wires 70 and 71, connecting the solenoid with the contact 23 and battery 36×, respectively.

The *modus operandi* of the invention is as follows: The material to be weighed is supplied by the hoppers 15 and 17, mechanically or otherwise, to the chutes 14 16, which will be open when the parts are in the relative position shown in Fig. 1—that is to say, when a bucket 7 is in the position to receive the material. At this stage the projection 38 will bear upon the pressure-plate 39, and the electrical circuit being made by the brush 23 by contact with strip 53 the solenoid 52 will operate to draw down the core and parts against the action of spring 58 to open shutter 48. The brush 24 will now lie within the gap 21 of the metallic disk, and its electrical circuit being now broken the core of its solenoid 25 will fall by gravity to operate the chute-outlet 59 through the medium of the connected mechanism. The pin 30, operated from the core 25, will now be out. The pan 7 will now be fed with the material to be weighed, and as it moves down and before the projection 38 leaves the pressure-plate 39 the contact 23 will leave strip 53, so as to break the electrical circuit, and the core 51 will be drawn up by spring 58 and the parts actuated to close the shutter 48 of the main chute. At this stage the contact-strip 24 will still remain in the gap 21, so that extension 59 will remain open, and the material will pour from this small chute until the contents of the buckets 7 are equivalent, by weight, to the final pressure of the plate 39 upon the projection 38 of the frames or disks, and the parts are so arranged relatively that immediately the loaded bucket 7 falls and the opposite projection 38 leaves the pressure-plate 39 the contact-strip 24 will meet the disk 18, (as it rotates,) so as to complete the electrical circuit and operate through the medium of the core 25 and link 28 to raise the core 25 and operate the mechanism to draw back the extension 59, in the meantime closing it into position shown in Fig. 3, and so stop the flow of material from the small chute 16. As the core 25 is sucked up the rod 27 will rise with it and the head 35 will strike the arm 31 of the bell-crank lever, so as to turn the same, while the other arm 32 will act upon the bolt 30, forcing it in, and the descending empty bucket 10 will be brought into position by the frame or other projection 38 coming in contact with the bolt or plate 30, the releasing action being simultaneous with the break of contact of brush 24. The forward contact-strip 23 will next meet the strip 56, so as to complete the electrical circuit and again open the shutter of the main chute 14, and the operation described will be repeated.

I would have it understood that by the term "goods" mentioned by me in the first paragraph of this specification I include all matters or materials of a fluid nature and liquids.

Having now particularly described and ascertained the nature of my said invention and in what manner the same is to be performed, I declare that what I claim is—

1. A weighing-machine comprising in combination, a number of pans or buckets arranged on a carrier supported from an axle and arranged to rotate, said buckets being pivoted between disks of which the carrier is composed, means for stopping a bucket at position to be fed and for exerting a force against its descent equivalent to weight required and means for supplying material to be weighed to bucket, said force exerting means acting to resist the rotary movement of the bucket-carrier, and comprising an adjustable weight, substantially as and for the purposes described.

2. In combination, a rotary carrier, a plurality of buckets carried thereby, a main and a small feed-hopper, a movable chute connected with the small feed-hopper, means for moving the same to and from position over the bucket and for closing said small feed-hopper when moved from position over the bucket, and means for controlling the feed through the main feed-hopper, substantially as described.

3. In combination, a rotary carrier, a plurality of buckets carried thereby, a main and a small feed-hopper, a movable chute connected with the small feed-hopper, means for moving the same to and from position over the bucket and means for controlling the feed through the main feed-hopper, a stop for controlling the movement of the carrier, said stop being operated by the means which moves the movable chute to and from position over the pan, substantially as described.

4. A weighing-machine comprising a plurality of buckets, a rotary carrier therefor, having an axle, a pressure-plate, projections moving with the rotary carrier and corresponding in number to the buckets, said pressure-plate being arranged to bear on the projection of an empty bucket while an oppositely-arranged bucket is being filled, a metallic strip supported from the axle, a feed-hopper over the bucket to be filled, an electrical circuit with brushes to make and break contact with the metallic strip, a shutter for the feed-hopper and mechanism controlled from the electric circuit to control the shutter, substantially as described.

5. A weighing-machine comprising a main and a small feed-hopper, a plurality of buckets, a rotary carrier having the buckets pivotally connected thereto, projections, one for each bucket moving with the carrier, a pressure-plate to bear on the projections, a lever connected to the said pressure-plate, a weight for said lever, said pressure-plate being arranged to bear upon the projection of an empty bucket while the oppositely-arranged bucket is in position to be filled, a metallic strip supported on the rotary carrier and having gaps and contact-pieces, an electric circuit in which said strip is included, contact-brushes arranged to make and break the circuit, a pair of solenoids with their cores and connections between said cores and the main and small feed-hoppers, substantially as described.

6. In combination, a plurality of buckets, a rotary carrier therefor comprising disks 6, a rotatable axle 5 for the disks, centers 4 for supporting the axle, pins 12 on the buckets, guide-stops 13 on the disks between which the pins 12 set, a shaft 41, a pressure-plate 39 arranged to turn about the center of said shaft, a lever 43 on the shaft, an adjustable weight on the lever, projections 38 moving with the rotary carrier, one for each bucket, a metallic strip 18 on the rotary shaft 5, having gaps and contact-strips, brushes 23, 24, circuit connections including said brushes, solenoids 26 and 52 in the electrical connections, cores for the solenoids, a slide for the main feed-hopper connections thereto from one of the solenoids, a flexible extension for the small feed-hopper connections thereto from the other solenoid-core, and a stop-pin 30 operated from the said connections, substantially as described.

7. A weighing-machine comprising in combination a number of pans or buckets that are pivoted between disks supported upon a rotatable axle, a pressure-plate arranged to bear upon a projection relating to an empty pan, while an oppositely-arranged pan is being filled, and means for supplying material to be weighed to bucket, substantially as described.

In testimony whereof I have signed my name to this specification in the presence of two subscribing witnesses.

HAROLD ALEXANDER DANNE.

Witnesses:
A. O. SACHSE,
A. HARKER.